Patented Apr. 7, 1931

1,799,787

UNITED STATES PATENT OFFICE

PAUL FEILER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF UNSATURATED HYDROCARBONS

No Drawing. Application filed September 21, 1928, Serial No. 307,552, and in Germany December 20, 1927.

This invention relates to improvements in the manufacture and production of valuable unsaturated hydrocarbons from lower members of the olefinic series, especially ethylene, or gases containing the same.

It is already known that when ethylene, or gases containing the same are passed through red hot tubes, butadiene is formed, together with other hydrocarbons. It is also known that acetylene is formed during the treatment of hydrocarbons in the electric arc.

I have now found, that valuable unsaturated hydrocarbons, in particular diolefines, such as butadiene are produced, in place of or besides acetylene, from lower members of the olefine series, especially from ethylene or gases containing the same, as for example the gases formed in cracking processes, if the said initial gases be exposed to the action of high temperature electrical discharges, under any convenient pressure and at a higher rate of flow than that required for the production of acetylene, for example as described above. The pressure may be reduced or may be atmospheric or may be elevated, for example 10, 20 or 50 atmospheres or even more. Suitable electrical discharges for this purpose comprise, for example, electric spark discharges or the electric arc. The electrodes used may be made of any convenient material, those of copper, nickel, nickel alloys, iron and the like, and cooled, as desired, being very suitable. If the operation be conducted with ethylene or gases containing the same, the products, in addition to butadiene, will also contain higher homologues of ethylene, such as propylene and butylene, together with a little acetylene.

It has been found that the composition of the resulting gaseous mixture is dependent upon the rate of flow of the gases and on the amount of electric energy introduced, and that the higher the energy of the electrical discharge, the higher must be the rate of flow of the gases. By the expression "rate of flow" I understand the amount of gases subjected to the action of the electrical discharge in the unit of time. As the rate of flow of the initial gases increases, the proportion of acetylene contained in the reaction gases diminishes, whereas the proportion of valuable hydrocarbons and especially of butadiene contained in the gases increases. Particularly good yields, especially of butadiene, are obtained by operating with the aforementioned high rate of flow in a closed cycle, in which case the resulting valuable hydrocarbons, such as butadiene and the like, are continuously removed from the gaseous mixture for example by cooling. As the initial material, ethylene may be replaced by its homologues, such as propylene and butylene, or by mixtures of olefines or gases containing the same.

The process herein described furnishes as a by-product, especially when high tension currents are employed, brown spongy masses of the character of cuprene, which contain more or less carbon, according to the conditions of working, and possess powerful adsorbent properties.

The following examples will further illustrate the nature of the said invention which however is not limited thereto.

Example 1

80 liters of a gas containing 97 per cent of ethylene are passed in a continuous cycle and at a velocity of about 20 liters per hour, through spark discharges. The sparks, 8 centimeters in length, are generated between copper electrodes and furnished by an induction machine with a primary consumption of about 60 watts. After passing through the sparks four times, a gas is obtained with the composition $C_nH_m$, 70.6 per cent; $H_2$, 25.8 per cent; $CH_4$, 0.8 per cent and $N_2$, 2.8 per cent.

The hydrocarbons of the formula $C_nH_m$ have the following composition:

| | Per cent by weight |
|---|---|
| Unaltered ethylene | 66.2 |
| Propylene | 13.4 |
| Butylene | 1.8 |
| Butadiene | 11.4 |
| Acetylene | 7.2 |

In addition, 0.5 gram of a brown mass resembling cuprene is obtained.

*Example 2*

A gas containing 97 per cent of ethylene is passed, at the rate of about 40 liters per hour, through an electric arc generated between carbon electrodes and having a consumption of about 200 watts. The resulting gaseous mixture has the following composition:

$C_nH_m$, 64.2 per cent; $H_2$, 29.9 per cent; $CH_4$, 3.6 per cent, $N_2$, 2.3 per cent.

The hydrocarbons of the formula $C_nH_m$ have the composition as follows:

| | Per cent by weight |
|---|---|
| Unaltered ethylene | 69.5 |
| Propylene | 15.0 |
| Butylene | 1.8 |
| Butadiene | 5.7 |
| Acetylene | 8.0 |

If, in both cases, the operation of working in a cycle be carried out while employing a higher rate of flow, and if desired removing the butadiene continuously after formation, higher yields of butadiene will be obtained with a further reduction in the output of the acetylene. Extensive conversion of the olefines into butadiene can be effected by prolonging the treatment or employing a greater electric energy.

What I claim is:

1. A process for the production of higher olefines and diolefines from lower members of the olefine series, which comprises exposing the initial gases at a higher rate of flow than that required for the production of acetylene to the action of high temperature electric discharges.

2. A process for the production of diolefines from gases containing lower members of the olefine series, which comprises exposing the initial gases at a higher rate of flow than that required for the production of acetylene to the action of high temperature electric discharges.

3. A process for the production of higher olefines and diolefines from lower members of the olefine series, which comprises exposing the initial gases at a higher rate of flow than that required for the production of acetylene to the action of high temperature electric discharges and carrying out the process in a closed cycle.

4. A process for the production of higher olefines and diolefines from lower members of the olefine series, which comprises exposing the initial gases at a higher rate of flow than that required for the production of acetylene to the action of high temperature electric discharges and carrying out the process in a closed cycle, the higher olefines and diolefines being removed therefrom continuously.

5. A process for the production of higher olefines and diolefines from lower members of the olefine series which comprises exposing the initial gases at a higher rate of flow than that required for the production of acetylene to the action of high temperature electric discharges and carrying out the process in a closed cycle, the higher olefines and diolefines being removed therefrom continuously by cooling.

6. A process for the production of diolefines, which comprises passing a gas containing ethylene through a spark discharge at a higher rate of flow than that required for the production of acetylene.

7. A process for the production of diolefines, which comprises passing a gas containing ethylene through a spark discharge generated between copper electrodes, the sparks being 8 centimeters in length, at a rate of 20 liters per hour.

In testimony whereof I have hereunto set my hand.

PAUL FEILER.